United States Patent
Morais et al.

(10) Patent No.: US 9,353,810 B2
(45) Date of Patent: May 31, 2016

(54) DISC BRAKE ASSEMBLY WITH NON-ROTATABLE VEHICLE COMPONENT AND METHOD FOR PRODUCING SAME

(71) Applicant: Kelsey-Hayes Company, Livonia, MI (US)

(72) Inventors: Eduardo Morais, South Lyons, MI (US); Daniel Smith, Livonia, MI (US); Sky Lintner, Ypsilanti, MI (US)

(73) Assignee: Kelsey-Hayes Company, Livonia, MI (US)

( * ) Notice: Subject to any disclaimer, the term of this patent is extended or adjusted under 35 U.S.C. 154(b) by 236 days.

(21) Appl. No.: 13/772,395

(22) Filed: Feb. 21, 2013

(65) Prior Publication Data

US 2014/0231191 A1 Aug. 21, 2014

(51) Int. Cl.
*F16D 65/14* (2006.01)
*F16D 65/00* (2006.01)
*F16D 55/226* (2006.01)
*F16D 55/00* (2006.01)

(52) U.S. Cl.
CPC .......... *F16D 65/0062* (2013.01); *F16D 55/226* (2013.01); *F16D 55/2262* (2013.01); *F16D 2055/007* (2013.01); *F16D 2055/0008* (2013.01); *Y10T 29/49963* (2015.01)

(58) Field of Classification Search
CPC ............ F16D 55/00; F16D 2055/0008; F16D 2055/007; F16D 55/2265; F16D 55/22655; F16D 55/227; F16D 65/0056; F16D 65/0068; F16D 65/0087; F16D 65/0093; F16D 65/0062; F16D 55/226; F16D 55/2262
See application file for complete search history.

(56) References Cited

U.S. PATENT DOCUMENTS

| | | | | |
|---|---|---|---|---|
| 5,927,446 A | * | 7/1999 | Evans | 188/73.44 |
| 6,039,156 A | | 3/2000 | Schneider | |
| 6,148,964 A | * | 11/2000 | Huang | 188/26 |
| 6,250,439 B1 | | 6/2001 | Matsuzaki | |
| 8,051,958 B1 | | 11/2011 | Rockwell et al. | |
| 2004/0188191 A1 | * | 9/2004 | Lintner | 188/73.45 |
| 2007/0051568 A1 | | 3/2007 | Barbosa et al. | |

(Continued)

FOREIGN PATENT DOCUMENTS

EP 1061282 A1 12/2000

OTHER PUBLICATIONS

Notification of Transmittal of the International Search Report, etc. for International Application No. PCT/US2014/017576 dated Jun. 26, 2014.

*Primary Examiner* — Melody Burch
(74) *Attorney, Agent, or Firm* — MacMillan, Sobanski & Todd, LLC (57) ABSTRACT

A disc brake assembly comprises an anchor bracket having a pair of arms, a caliper supported on the bracket and a non-rotatable vehicle component having a pair of lugs, each of the lugs provided with a non-threaded opening formed therethrough. The non-threaded openings receive fasteners installed in threaded openings of the bracket to secure the vehicle component to the bracket. The bracket includes on at least one of the arms a first shoulder at a transition between the first and second portions thereof. The vehicle component includes on at least one of the lugs a second shoulder having a shape which is generally complimentary to the shape of the first shoulder. When the vehicle component and bracket are secured together, selected surfaces of the first and second shoulders contact each other to substantially prevent movement of the bracket relative to the vehicle component.

19 Claims, 7 Drawing Sheets

(56) References Cited

U.S. PATENT DOCUMENTS

2008/0067015 A1 3/2008 Thomas et al.
2009/0314593 A1* 12/2009 Schmandt et al. .......... 188/70 R
2012/0067678 A1 3/2012 Andrews et al.

* cited by examiner

DISC BRAKE ASSEMBLY WITH NON-ROTATABLE VEHICLE COMPONENT AND METHOD FOR PRODUCING SAME

This invention relates in general to vehicle brake assemblies and in particular to an improved structure for a disc brake assembly with an associated non-rotatable vehicle component, preferably in particular with a knuckle, axle flange or a drum-in-hat adapter, and method for producing same.

Most vehicles today are equipped with a brake system for slowing or stopping movement of the vehicle in a controlled manner. A typical brake system for an automobile or truck includes a disc brake assembly for each of the front wheels and either a drum brake assembly or a disc brake assembly for each of the rear wheels. The brake assemblies are typically actuated by hydraulic or pneumatic pressure generated when an operator of the vehicle depresses a brake pedal. The structures of these drum brake assemblies and disc brake assemblies, as well as the actuators therefore are well known in the art.

A typical disc brake assembly includes a caliper assembly which is slidably supported on pins secured to an anchor bracket. The anchor bracket is secured to a stationary or non-rotatable component of the vehicle, such as the axle flange or steering knuckle, connected to the vehicle frame. The caliper assembly includes a pair of brake shoes which are disposed on opposite axial sides of a brake rotor. The brake shoes are connected to one or more hydraulically or pneumatically actuated pistons for movement between a non-braking position, wherein they are spaced apart from opposed axial sides or braking surfaces of the rotor, and a braking position, wherein they are moved into frictional engagement with the opposed braking surfaces of the rotor. When the operator of the vehicle depresses the brake pedal, the piston urges the brake shoes from the non-braking position to the braking position so as to frictionally engage the opposed braking surfaces of the rotor and thereby slow or stop the rotation of the associated wheel of the vehicle.

Typically, the anchor bracket includes a pair of arms interconnected by an inner tie. The anchor bracket includes two pairs of apertures formed therethrough. One of the pairs of apertures is adapted to receive bolts for securing the anchor bracket to the non-rotatable component of the vehicle. The other pair of apertures are adapted to receive bolts or slide pins for slidably supporting the caliper relative to the anchor bracket. In some instances, the anchor bracket may also include an outer tie bar. The arms of the anchor bracket have upstanding guide rails formed thereon for supporting the pair of brake shoes for sliding movement along a pair of anchor bracket guide rails. During braking, the anchor bracket functions to transmit the braking torque through the associated vehicle component to the vehicle frame.

SUMMARY OF THE INVENTION

This invention relates to an improved structure for a vehicle disc brake assembly with an associated non-rotatable vehicle component, preferably in particular with a knuckle, axle flange or a drum-in-hat adapter, and method for producing same.

According to one embodiment, the disc brake assembly may comprise, individually and/or in combination, one or more of the following features: an anchor bracket having a pair of arms, each of the arms including a first non-threaded opening formed in a first portion thereof and a second threaded opening formed in a second portion thereof; a caliper supported on the anchor bracket by first fasteners which are configured to be installed in the caliper and be disposed in the first non-threaded openings of the anchor bracket; and a non-rotatable vehicle component having a pair of lugs, each of the lugs provided with a third non-threaded opening formed therethrough, the third non-threaded openings configured to receive second fasteners therein which are installed in the second threaded openings of the anchor bracket to secure the non-rotatable vehicle component to the anchor bracket; wherein the anchor bracket includes on at least one of the arms a first shoulder at a transition between the first and second portions thereof; wherein the non-rotatable vehicle component includes on at least one of the lugs a second shoulder having a shape which is generally complimentary to the shape of the first shoulder of the at least one arm of the anchor bracket such that when the non-rotatable vehicle component and anchor bracket are secured together by the second fasteners selected surfaces of the first and second shoulders contact each other to substantially prevent movement of the anchor bracket relative to the non-rotatable vehicle component.

According to this embodiment of the disc brake assembly, the non-rotatable vehicle component may be one of a knuckle, an axle flange and a drum-in-hat adapter.

According to this embodiment of the disc brake assembly, the second threaded openings in the anchor bracket may define a first axis and the third non-threaded openings in the non-rotatable vehicle component may define a second axis which is offset relative to the first axis.

According to this embodiment of the disc brake assembly, the second threaded openings in the anchor bracket may define a first axis and the third non-threaded openings in the non-rotatable vehicle component may define a second axis which is coaxial relative to the first axis.

According to this embodiment of the disc brake assembly, at least one of the second fasteners may include a conical shaped surface, at least one of the third non-threaded openings of the non-rotatable vehicle component may include a conical shaped surface, wherein the conical shaped surface of the at least one of the third non-threaded openings of the non-rotatable vehicle component may be configured to be at least partially contacted by the conical shaped surface of the at least one of the second fasteners.

According to this embodiment of the disc brake assembly, the conical shaped surface on the at least one of the third non-threaded openings of the non-rotatable component may be located on a side of the non-rotatable component which is opposite to a side having the first shoulder provided thereon at the transition between the first and second portions thereof.

According to this embodiment of the disc brake assembly, the selected surfaces of the first and second shoulders of the anchor bracket and the non-rotatable vehicle component, respectively, may be axially extending shoulder surfaces.

According to this embodiment of the disc brake assembly, the second shoulder of the lug on the at least one of the lugs of the non-rotatable vehicle component may include a radially extending surface which does not contact the anchor bracket.

According to this embodiment of the disc brake assembly, the second openings in the anchor bracket may define a first axis and the third non-threaded openings in the non-rotatable vehicle component may define a second axis which is offset relative to the first axis, wherein at least one of the second fasteners may include a conical shaped surface, at least one of the third non-threaded openings of the non-rotatable vehicle component may include a conical shaped surface, wherein the conical shaped surface of the at least one of the third non-threaded openings of the non-rotatable vehicle component may be configured to be at least partially contacted by the conical shaped surface of the at least one of the second fasteners.

According to this embodiment of the disc brake assembly, an outer surface of the second fasteners may be spaced from contact relative to an inner diameter surface of the non-threaded third openings of the non-rotatable vehicle component when the non-rotatable vehicle component and anchor bracket are secured together.

According to another embodiment, the disc brake assembly may comprise, individually and/or in combination, one or more of the following features: an anchor bracket having a pair of arms interconnected by at least one tie bar, each of the arms including a first non-threaded opening formed in a first portion thereof and a second threaded opening formed in a second portion thereof; a caliper supported on the anchor bracket by first fasteners which are configured to be installed in the caliper and be disposed in the first non-threaded openings of the anchor bracket; and a non-rotatable vehicle component having a pair of lugs, each of the lugs provided with a third non-threaded opening formed therethrough, the third non-threaded openings configured to receive second threaded fasteners therein which are installed in the second threaded openings of the anchor bracket to secure the non-rotatable vehicle component to the anchor bracket; wherein the anchor bracket includes on at least one of the arms a first shoulder at a transition between the first and second portions thereof; wherein the non-rotatable vehicle component includes on at least one of the lugs a second shoulder having a shape which is generally complimentary to the shape of the first shoulder of the at least one arm of the anchor bracket such that when the non-rotatable vehicle component and anchor bracket are secured together by the second threaded fasteners selected surfaces of the first and second shoulders contact each other to substantially prevent movement of the anchor bracket relative to the non-rotatable vehicle component; wherein the second openings in the anchor bracket define a first axis and the third non-threaded openings in the non-rotatable vehicle component define a second axis which is offset relative to the first axis; wherein at least one of the second threaded fasteners includes a conical shaped surface, at least one of the third non-threaded openings of the non-rotatable vehicle component includes a conical shaped surface, wherein the conical shaped surface of the at least one of the third non-threaded openings of the non-rotatable vehicle component is configured to be at least partially contacted by the conical shaped surface of the at least one of the second threaded fasteners.

According to this embodiment of the disc brake assembly, the non-rotatable vehicle component may be one of a knuckle, an axle flange and a drum-in-hat adapter.

According to this embodiment of the disc brake assembly, the selected surfaces of the first and second shoulders of the anchor bracket and the non-rotatable vehicle component, respectively, may be axially extending shoulder surfaces.

According to this embodiment of the disc brake assembly, the second shoulder of the lug on the at least one of the lugs of the non-rotatable vehicle component may include a radially extending surface which does not contact the anchor bracket.

According to this embodiment of the disc brake assembly, an outer surface of the second fasteners may be spaced from contact relative to an inner diameter surface of the non-threaded third openings of the non-rotatable vehicle component when the non-rotatable vehicle component and anchor bracket are secured together.

According to this embodiment of the disc brake assembly, the conical shaped surface on the at least one of the third non-threaded openings of the non-rotatable component may be located on a side of the non-rotatable component which is opposite to a side having the first shoulder provided thereon at the transition between the first and second portions thereof.

According to another embodiment, a method may comprise, individually and/or in combination, one or more of the steps of: (a) providing an anchor bracket having a pair of arms, each of the arms including a first non-threaded opening formed in a first portion thereof and a second threaded opening formed in a second portion thereof; (b) supporting a caliper on the anchor bracket by first fasteners which are configured to be installed in the caliper and be disposed in the first non-threaded openings of the anchor bracket; and (c) securing the anchor bracket to a non-rotatable vehicle component having a pair of lugs by second fasteners, wherein each of the lugs is provided with a third non-threaded opening formed therethrough, the third non-threaded openings configured to receive second fasteners therein which are installed in the second threaded openings of the anchor bracket to secure the non-rotatable vehicle component to the anchor bracket, wherein the anchor bracket includes on at least one of the arms a first shoulder at a transition between the first and second portions thereof, and wherein the non-rotatable vehicle component includes on at least one of the lugs a second shoulder having a shape which is generally complimentary to the shape of the first shoulder of the at least one arm of the anchor bracket such that when the non-rotatable vehicle component and anchor bracket are secured together by the second fasteners selected surfaces of the first and second shoulders contact each other to substantially prevent movement of the anchor bracket relative to the non-rotatable vehicle component.

According to this embodiment, at least one of the second fasteners may include a conical shaped surface, at least one of the third non-threaded openings of the non-rotatable vehicle component includes a conical shaped surface, and wherein during the step (c) the conical shaped surface of the at least one of the third non-threaded openings of the non-rotatable vehicle component may be configured to be at least partially contacted by the conical shaped surface of the at least one of the second fasteners as the second fasteners are tightened to thereby move the anchor bracket relative to non-rotatable vehicle component.

According to this embodiment, during the step (c) axially extending selected shoulder surfaces of the first and second shoulders of the anchor bracket and the non-rotatable vehicle component, respectively, may contact each other.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
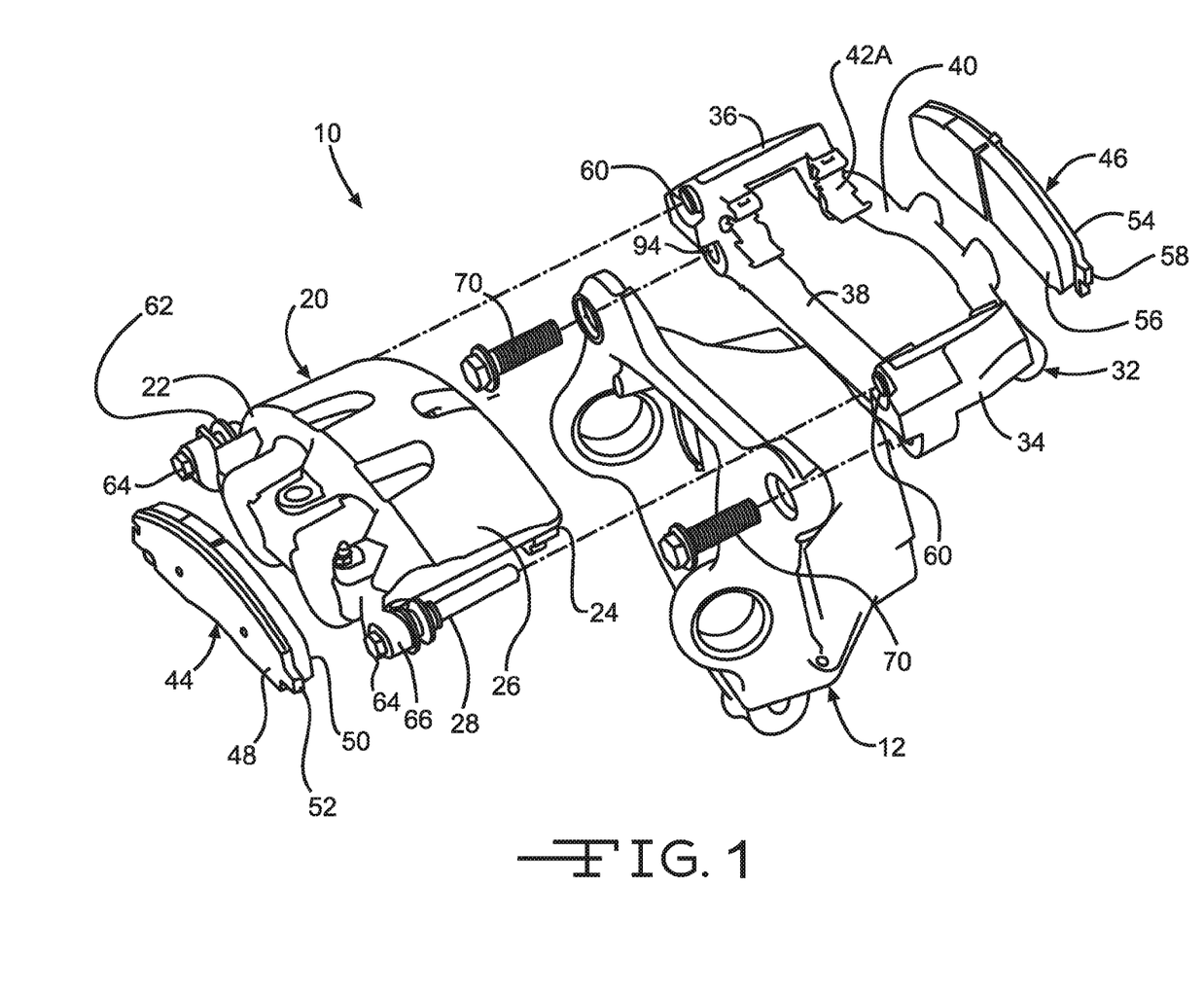
FIG. 1 is an exploded perspective view of a portion of a first embodiment of a vehicle disc brake assembly with a knuckle, constructed in accordance with the present invention.

Referring now to FIG. 1, there is illustrated a portion of a first embodiment of a vehicle disc brake assembly, indicated generally at 10, with a knuckle, indicated generally at 12, in accordance with the present invention. The general structure and operation of the disc brake assembly 10 is conventional in the art. Thus, only those portions of the disc brake assembly 10 which are necessary for a full understanding of this invention will be explained and illustrated.

Also, although this invention will be described and illustrated in connection with the particular vehicle disc brake assembly 10 disclosed herein, it will be appreciated that this invention may be used in connection with other types or kinds of disc brake assemblies, such as for example, as generally shown in U.S. Pat. No. 8,051,958 to Rockwell et al., U.S. Pat. No. 6,039,156 to Schneider, and U.S. Pat. No. 5,927,446 to Evans, the disclosures of each of these patents incorporated herein by reference in their entirety, and/or in connection with other types of kinds of "pin guided" or "pin sliding" disc brake assemblies, if so desired.

Furthermore, while the disc brake assembly 10 is illustrated in connection with the knuckle 12 as being the stationary or non-rotatable component of the vehicle to which the disc brake assembly 10 is secured (as would occur when the disc brake assembly 10 is installed for use on the front of the vehicle), the disc brake assembly 10 can also be secured to other associated stationary or non-rotatable vehicle components, such as for example an axle flange or a drum-in-hat adapter (not shown and as occur when the disc brake assembly 10 is installed for use on the rear of the vehicle), if so desired. In this case, the associated structure to be discussed below in connection with the knuckle 12 would also apply to the axle flange or drum-in-hat adapter.

As shown in the illustrated embodiment of FIG. 1, the disc brake assembly 10 is a pin guided or pin sliding type of disc brake assembly and includes a generally C-shaped caliper, indicated generally at 20. The caliper 20 includes an inboard leg portion 22 and an outboard leg portion 24 which are interconnected by an intermediate bridge portion 26. The caliper 20 is slidably supported on a pair of the guide pins 28 which are secured to an anchor bracket, indicated generally at 32. As will be discussed below in connection with the first embodiment of the present invention, the anchor bracket 32 is, in turn, secured to a stationary component of the vehicle by suitable fasteners, such as for example bolts 70, which are configured to be disposed in threaded openings 94 provided in the anchor bracket 32. As shown in this embodiment, such a stationary component can be, for example, the steering knuckle 12, when the disc brake assembly 10 is installed for use on the front of the vehicle, or can be, for example, an axle flange or drum-in-hat adapter (not shown), when the disc brake assembly 10 is installed for use on the rear of the vehicle.

In the illustrated embodiment, the anchor bracket 32 includes a pair of axially and outwardly extending arms 34 and 36. The arms 34 and 36 are interconnected at their inboard ends by an inner tie bar 38 and which are interconnected at their outboard ends by an outer tie bar 40. The arms 34 and 36 each have a pair of generally C-shaped channels (shown in FIG. 5 at 42) formed thereon and a clip 42A installed in each of the channels. The clips 42A installed in the channels 42 are provided to slidably support an inboard brake shoe, indicated generally at 44, and an outboard brake shoe, indicated generally at 46, thereon. Alternatively, the construction and/or configuration of the anchor bracket 32 may be other than illustrated and described if so desired.

In the illustrated embodiment, the inboard brake shoe 44 includes a backing plate 48 and a friction pad 50. The inboard backing plate 48 includes opposed ends having tabs or protrusions 52 formed thereon, for supporting the inboard brake shoe 44 in the clips 42A installed in the channels 42 of the anchor bracket 32. The outboard brake shoe 46 includes a backing plate 54 and a friction pad 56. The outboard backing plate 54 includes opposed ends having tabs or protrusions 58 formed thereon, for supporting the outboard brake shoe 46 in the clips 42A installed in the channels 42 of the anchor bracket 32. Alternatively, the construction and/or supporting of one or both of the brake shoes 44 and 46 may be other than illustrated and described if so desired. For example, the inboard brake shoe 44 can be supported on a brake piston/pistons (not shown) of the disc brake assembly 10, and/or the outboard brake shoe 46 can be supported on the outboard leg portion 24 of the caliper 20, if so desired.

In the illustrated embodiment, an actuation means (not shown) is provided for effecting the operation of the disc brake assembly 10. In the illustrated embodiment, the actuation means includes the pair of brake pistons (not shown) each of which is disposed in a counterbore or recess (not shown), formed in an outboard surface of the inboard leg 22 of the caliper 20. The actuation means can be hydraulic, electrical, pneumatic, and mechanical types.

As shown in FIG. 1, each of the guide pins 28 is disposed in a non-threaded bore 60 provided in each of the arms 34 and 36 of the anchor bracket 32. A boot seal 62 is preferably installed in each of the openings (not shown) provided in the caliper 20 through which each of the guide pins 28 extend. A pair of threaded fasteners 64 are provided to slidably secure the caliper 20 to the anchor bracket 32. The fasteners 64 extend through openings (not shown) provided in lugs or ears 66 of the caliper 20 and are installed in an internally threaded bore (not shown), provided in each guide pin 28. Alternatively, the construction of the caliper 20, the guiding means of the caliper 20, and/or the supporting of the caliper 20 relative to the anchor bracket 32 can be other than illustrated and described, if so desired.

Figure 2:
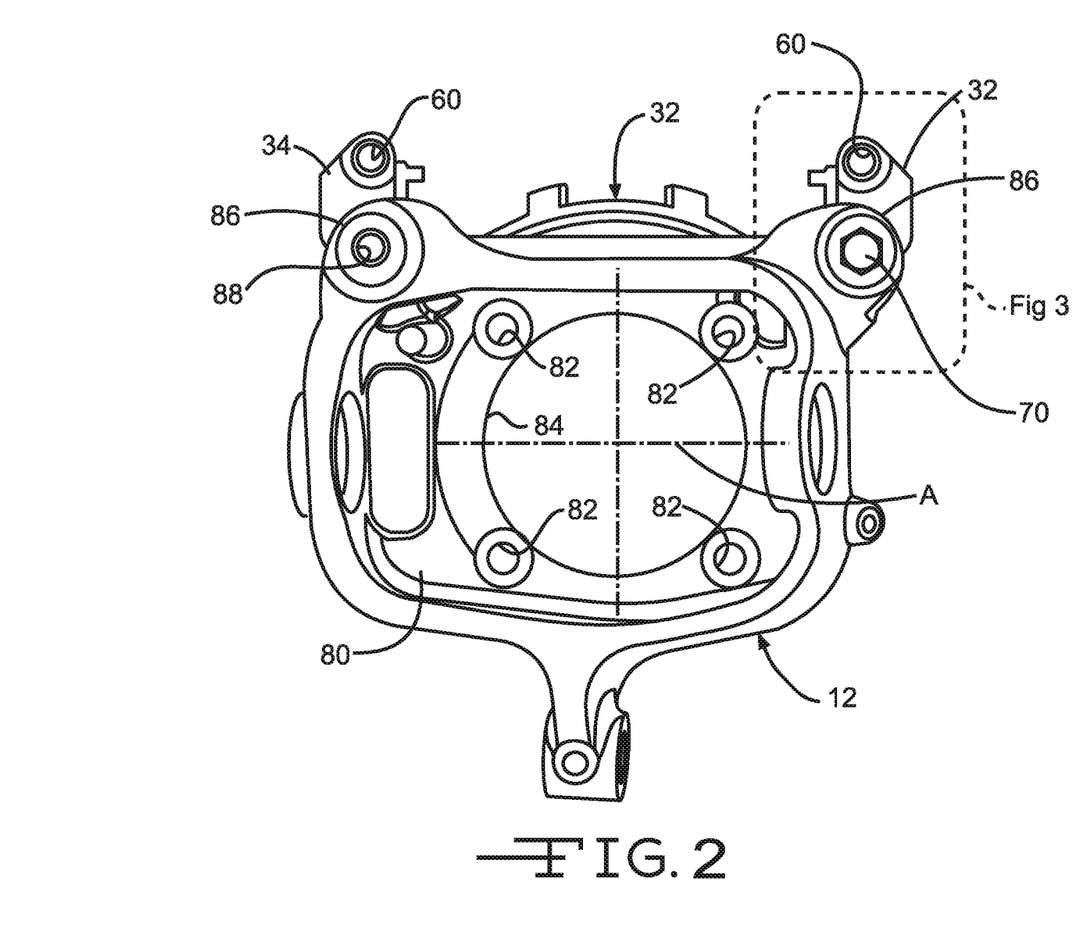
FIG. 2 is a side view of a portion of the vehicle disc brake assembly illustrated in FIG. 1.
Figure 3:
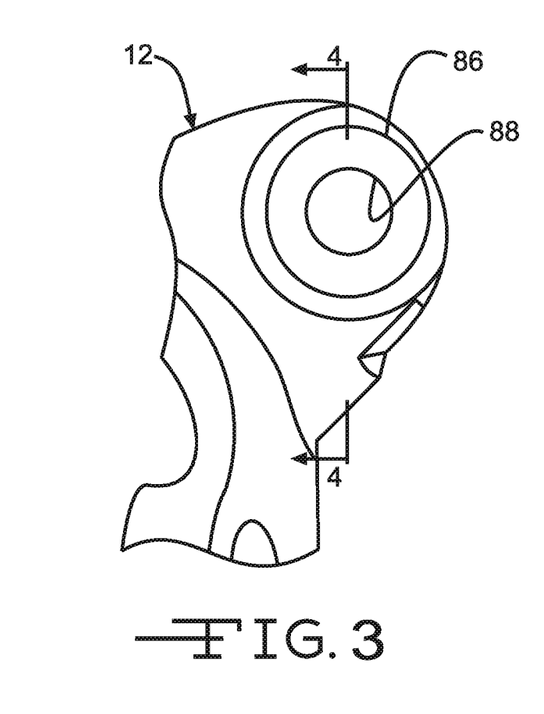
FIG. 3 is a side view of a portion of the vehicle disc brake assembly illustrated in FIG. 2, showing only the knuckle.
Figure 4:
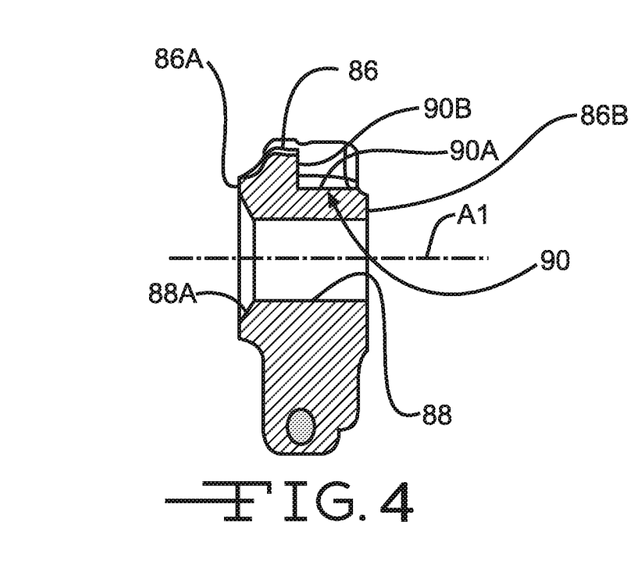
FIG. 4 is a view taken along line 4-4 of FIG. 3.

Turning now to FIGS. 2-8, the construction of the first embodiment of the disc brake assembly 10 with knuckle 12 will be discussed in detail. Referring first to FIGS. 2-4, the construction of the illustrated embodiment of the knuckle 12 will be discussed. The general structure and operation of the knuckle 12 is conventional in the art. Thus, only those portions of the knuckle 12 which are necessary for a full understanding of this invention will be explained and illustrated. As shown therein, in the illustrated embodiment the knuckle 12 defines an axis A and includes a main body 80 having a plurality of mounting openings 82, a central opening 84 and a pair of lugs or extensions 86 each having a non-threaded opening 88 formed therethrough. Each of the openings 88 extend from a first or outer surface 86A of the lugs 86 clear through to a second or inner surface 86B of the lugs 86.

As best shown in FIG. 4, in the illustrated embodiment each of the openings 88 preferably include a generally conical or tapered lead-in portion or surface 88A provided in the first surface 86A of each of the lugs 86 for a purpose to be discussed below. In addition, in the illustrated embodiment each of the lugs 86 includes a shoulder or step, indicated generally at 90, provided in the second surface 86B thereof for a purpose to be discussed below.

As best shown in FIG. 4, each of the shoulders 90 includes a first surface 90A, which defines a "hard stop" surface feature, and a second surface 90B. In the illustrated embodiment, the first surface 90A is preferably a flat surface and is generally parallel relative to an axis A1 of the opening 88 of the knuckle 12, with the axis A1 being parallel to and offset relative to the axis A of the knuckle. Also, in the illustrated embodiment, the second surface 90B is preferably a flat surface and extends generally perpendicular to the first surface 90A and therefore the axis A1.

Figure 5:
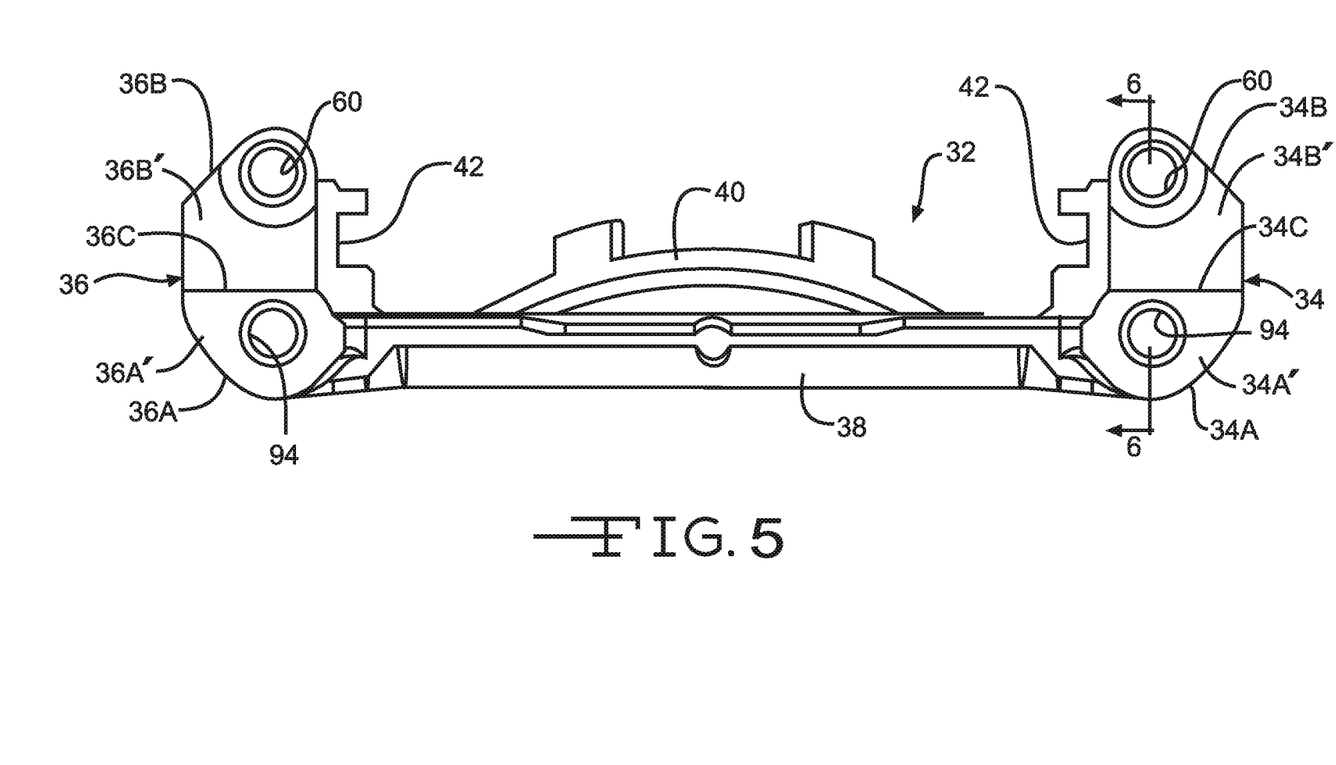
FIG. 5 is a side view of a portion of the vehicle disc brake assembly illustrated in FIG. 2, showing only an anchor bracket of the vehicle disc brake assembly.
Figure 6:
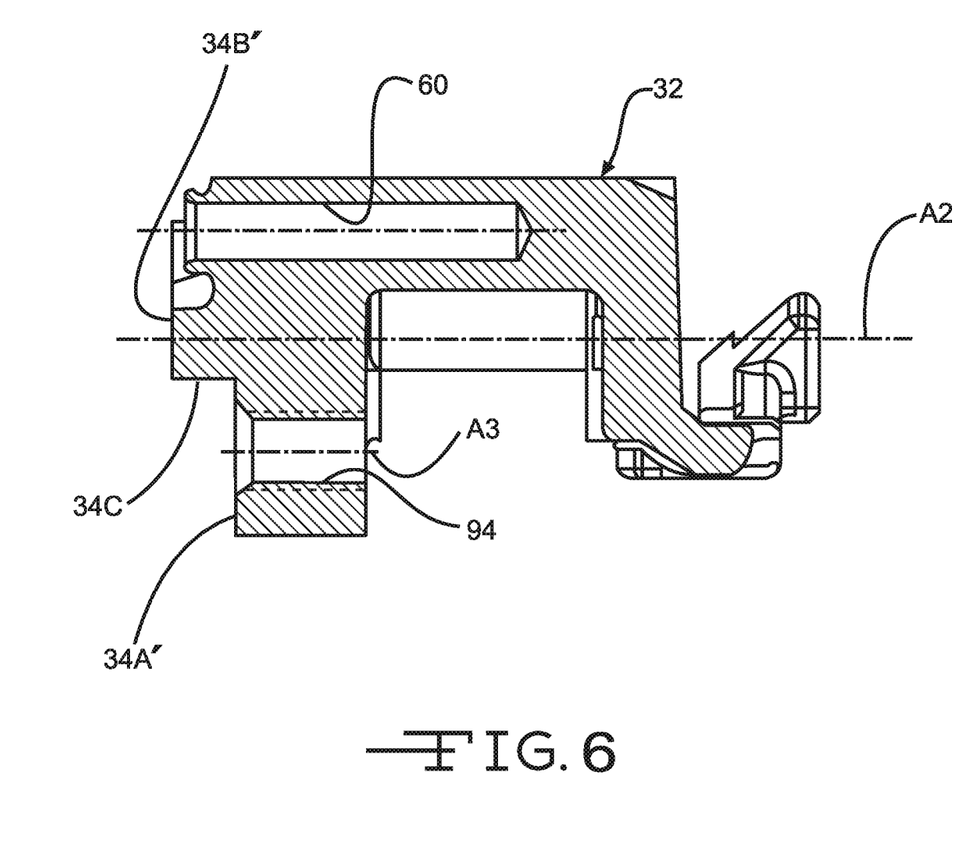
FIG. 6 is a view taken along line 6-6 of FIG. 5.

Referring now to FIGS. 5 and 6, the construction of the illustrated embodiment of the anchor bracket 32 will be further discussed. As shown therein, in the illustrated embodiment the anchor bracket 32 defines an axis A2 and further includes a threaded opening 94 provided in a lower portion 34A and 36A, respectively of each of the arms 34 and 36 thereof. Each of the openings 94 defines an axis A3 which is parallel to and offset relative to the axis A2 of the anchor bracket 32.

As can be seen in FIG. 6, in the illustrated embodiment an associated inner end surface 34A' and 36A' of the lower portions 34A and 36A of each of the arms 34 and 36, respectively, is offset relative to an associated inner end surface 34B' and 36B' of upper portions 34B and 36B of each of the arms 34 and 36, respectively. As a result of this, at the associated inner end surfaces 34A', 34B' and 36A', 36B', of each of the arms 34 and 36, respectively, the anchor bracket 32 has a stepped or bifurcated type of construction. As a result of this, in the illustrated embodiment the anchor bracket 32 is provided with a shoulder or step, indicated at 34C and 36C, which defines a "hard stop" surface feature on each of the arms 34 and 36, respectively. In the illustrated embodiment, the shoulders 34C and 36C are preferably each a flat surface and is generally parallel relative to an axis A3 of the opening 94 of the anchor bracket 32. As can be seen, the shoulders 34C and 36C of the arms 34 and 36, respectively, of the anchor bracket 32 have a shape or configuration which is generally complimentary to the shape or configuration of the shoulders 90A of the lugs 90 of the knuckle 12 for a purpose to be discussed below.

Figure 7:
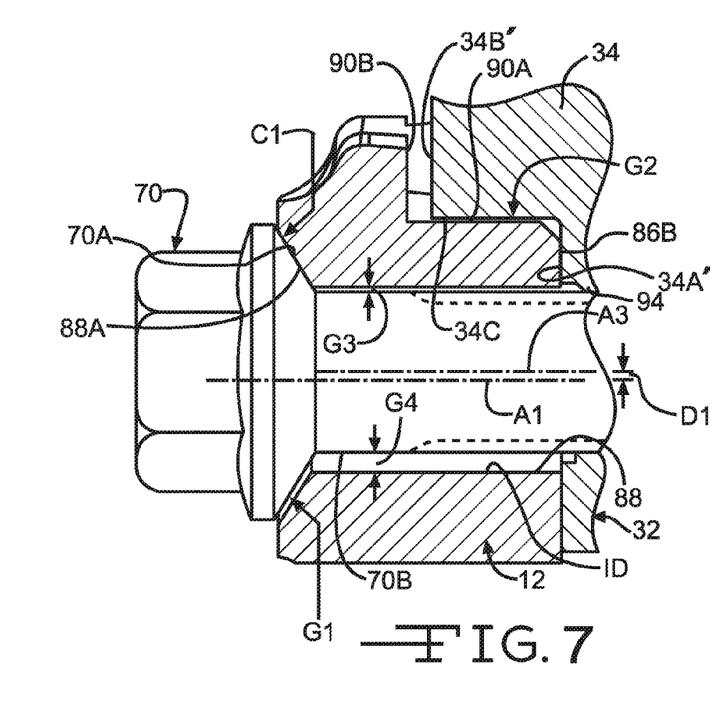
FIG. 7 is an enlarged sectional view of a portion of the vehicle disc brake assembly illustrated in FIG. 1, showing a partially installed bolt position.
Figure 8:
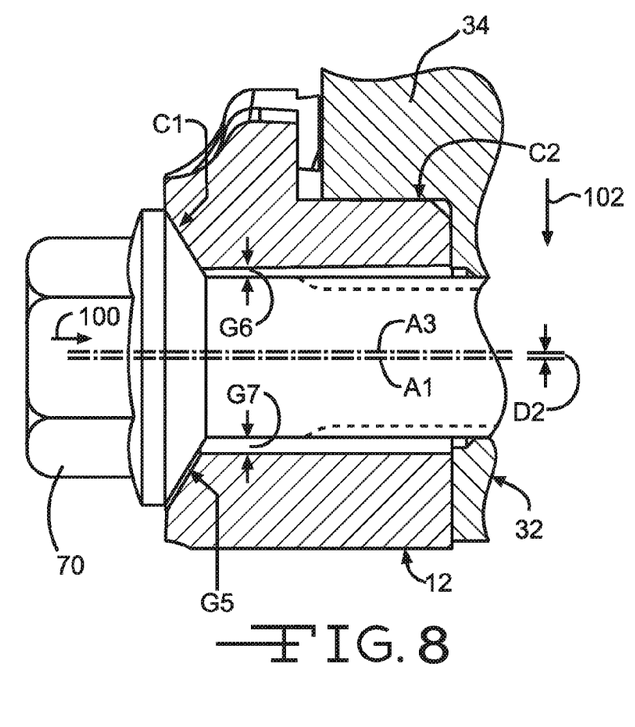
FIG. 8 is an enlarged section view similar to FIG. 7 of a portion of the vehicle disc brake assembly illustrated in FIG. 7, showing a fully installed bolt position.

Referring now to FIGS. 7 and 8, the assembly of the anchor bracket 32 to the steering knuckle 12, will be discussed in connection with the details of arm 34 of the anchor bracket 32; however, as can be understood, the assembly of the anchor bracket to the steering knuckle 12 with respect to arm 36 of the anchor bracket 32 is preferably the same as that of arm 32.

FIG. 7 illustrates the assembly condition when the bolt 70 has been installed and tightened to a point such that the inner end surface 34A' of the arm 34 of the anchor bracket 32 contacts the second surface 86B of the lug 86 of the knuckle 12. Initially, as can be seen, when the bolt 70 is installed there is preferably no contact between an outer surface 70B of the bolt 70 and an inner diameter surface ID of the opening 88. Since there is no contact between the outer surface 70B and the inner diameter surface ID, there is a gap therebetween which allows movement of "free play" between the bolt 70 and the inner diameter surface ID of the opening 88 for a purpose to be discussed below.

As can be seen in FIG. 7, when in this assembly condition at least the following conditions preferably exist in accordance with the present invention: (1) the axis A1 of the opening 88 of the knuckle 12 is offset a distance D1 relative to the axis A3 of the threaded opening 94 of the anchor bracket 32; (2) a conical surface 70A of the bolt 70 contacts the conical surface 88A of the opening 88 at a "top" side thereof, shown generally at C1, while a gap G1 exists between the conical surface 70A of the bolt 70 and the conical surface 88A of the opening 88 at a "bottom" side thereof; (3) a gap G2 exists between the "hard stop" surface feature or shoulder 34C of the arm 34 of the anchor bracket 32 and the "hard stop" or first surface 90A of the lug 86 of the knuckle 12; (4) an outer surface of the bolt 70 is not evenly spaced circumferentially within an inner diameter surface of the opening 88 of the knuckle as shown in FIG. 7 by a first clearance therebetween of G3 at a "top side" thereof compared to second larger clearance therebetween of G4 at a "lower side" thereof; and (5) the second surface 90B of the shoulder 90 of the lug 86 is spaced from contact with the inner end surface 34B' of the upper portion 34B of the arm 34 of the anchor bracket 32.

Referring now to FIG. 8, there is illustrated the assembly condition when the bolt 70 has been fully installed and fully tightened (i.e., the bolt 70 further travels in the direction of arrow 100 in FIG. 8), to its final installation condition such that the conical surface 70A of the bolt 70 is caused to ride, travel or "ramp" down along the conical surface 88A of the opening 88 thereby causing the anchor bracket 32 to move downwardly in the direction of arrow 102 in FIG. 8. As can be understood, during the tightening of the bolt 70 during this operation the bolt 70 will deflect slightly during the installation process depending upon the interference or contact between the associated conical surfaces 70A and 88A thereof at the top side thereof.

As can be seen in FIG. 8, when this occurs at least the following conditions preferably exist in accordance with the present invention: (1) the axis A1 of the opening 88 of the knuckle 12 is preferably offset a distance D2 relative to the axis A3 of the threaded opening 94 of the anchor bracket 32, with the distance D2 being less than the distance D1 and/or the distance D2 being substantially zero in some circumstances depending upon manufacturing tolerances; (2) the conical surface 70A of the bolt 70 remains in contact with the conical surface 88A of the opening 88 at a top side thereof, shown generally at C1, while a gap G5 exists between the conical surface 70A of the bolt 70 and the conical surface 88A of the opening 88 at a bottom side thereof, with the gap G5 being less than the gap G1; however the gap G5 may be substantially zero in some circumstances depending upon certain design considerations and/or manufacturing tolerances; (3) the "hard stop" surface feature or shoulder 34C of the arm 34 of the anchor bracket 32 contacts the "hard stop" or first surface 90A of the lug 86 of the knuckle 12, generally as shown at C2 (i.e., the gap G2 from the condition shown in FIG. 7 no longer exists); (4) an outer surface of the bolt 70 is generally not evenly spaced circumferentially within the inner diameter surface of the opening 88 of the knuckle as shown in FIG. 8 by a first clearance therebetween of G6 at a "top side" thereof compared to second clearance therebetween of G7 at a "lower side" thereof (i.e., preferably clearance G7 is slightly larger than clearance G6 and compared to clearances G3 and G4 clearances G6 and G7 are smaller than clearance G4 but greater than clearance G3; however, the clearances G6 and G7 may be substantially the same in some circumstances depending upon certain design considerations and/or manufacturing tolerances); and (5) the second surface 90B of the shoulder 90 of the lug 86 still remains spaced from contact with the inner end surface 34B' of the upper portion 34B of the arm 34 of the anchor bracket 32.

As can be understood, when the anchor bracket 32 and the knuckle 12 are in the final installed condition shown in FIG. 8, the contact between the hard stop surface feature or shoulder 34C of the arm 34 of the anchor bracket 32 and the hard stop or first surface 90A of the lug 86 of the knuckle 12 substantially prevents or restricts any anchor bracket 32 movement and/or rotational slippage between the anchor bracket 32 and the knuckle 12.

Figure 9:
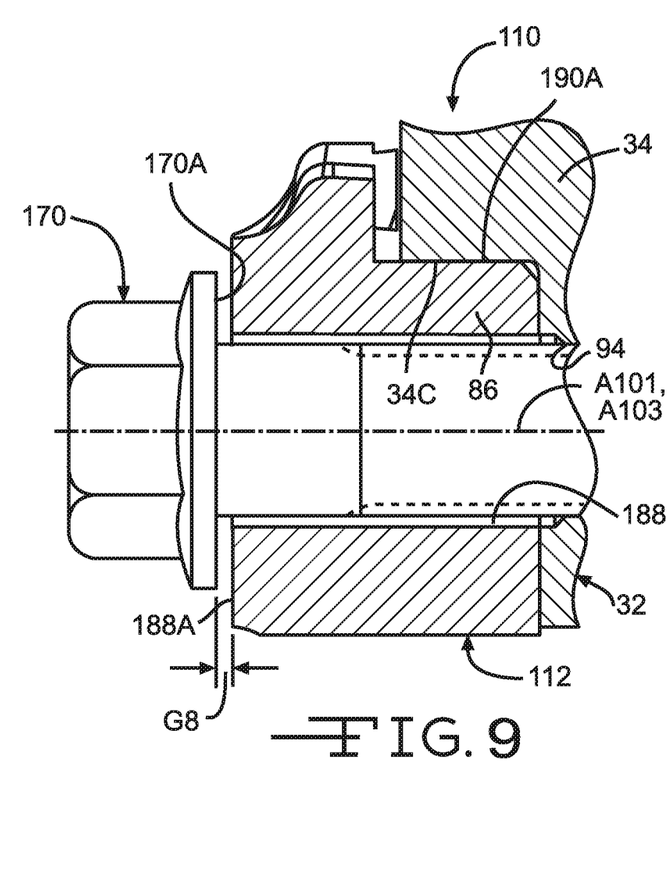
FIG. 9 is an enlarged section view similar to FIG. 7 of a portion of a second embodiment of a vehicle disc brake assembly, showing a partially installed bolt position.
Figure 10:
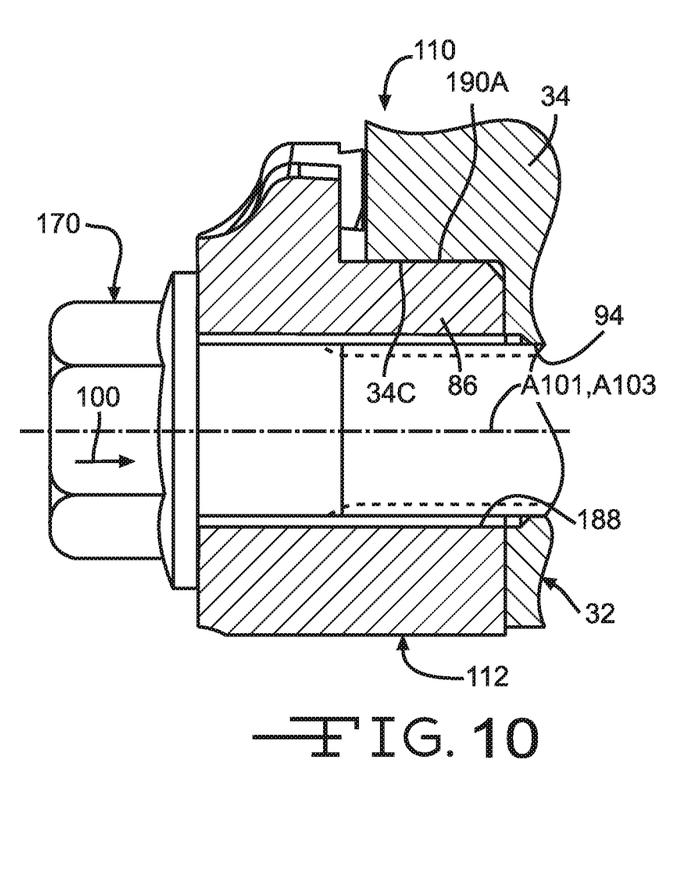
FIG. 10 is an enlarged section view similar to FIG. 9 of a portion of the second embodiment of a vehicle disc brake assembly, showing a fully installed bolt position.

Referring now to FIGS. 9 and 10 and using like reference numbers to indicate corresponding parts and adding "100" to the reference numbers used in connection with the first embodiment to indicate similar but different reference numbers in this embodiment, there is illustrated a portion of a second embodiment of a vehicle disc brake assembly, indicated generally at 110, which are similar to FIGS. 7 and 8, respectively, except for the following differences. As can be seen in FIGS. 9 and 10, in this embodiment an axis A101 of a non-threaded opening 188 of a non-notatable vehicle component 112 is coaxial with respect to an axis A103 of the threaded opening 94 provided in the anchor bracket 32. Also, in this embodiment the non-rotatable vehicle component 112 can be any suitable non-rotatable vehicle component, such as for example a knuckle, an axle flange or a drum-in-hat adapter. In addition, in this embodiment, a bolt 170 has a generally flat surface 170A which engages a corresponding generally flat surface 188A of an opening 88 provided in the non-rotatable component 112. As can be understood, when the bolt 170 is tightened from the non-final assembly position shown in FIG. 9 (i.e., a gap G8 is present between surfaces 170A and 188A), to the final assembly position shown in FIG. 10 (i.e., bolt 170 moves to the right in FIG. 10 as indicated by arrow 100 such that the gap G8 is no longer present), the anchor bracket 32 and the non-rotatable vehicle component 112 are in their final installed condition. When this occurs, the contact between the hard stop surface feature or shoulder 34C of the arm 34 of the anchor bracket 32 and a hard stop or first surface 190A of a lug 186 of the non-rotatable vehicle component 112 is the substantially the same as that shown in FIG. 8 which is effective to substantially prevent or restrict any anchor bracket 32 movement and/or rotational slippage between the anchor bracket 32 and the non-rotatable vehicle component 112.

In accordance with the provisions of the patent statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A disc brake assembly comprising:
   an anchor bracket having a pair of arms, each of the arms including a first non-threaded opening formed in a first portion thereof and a second threaded opening formed in a second portion thereof;
   a caliper supported on the anchor bracket by first fasteners which are configured to be installed in the caliper and be disposed in the first non-threaded openings of the anchor bracket; and
   a non-rotatable vehicle component defining an axis and having a pair of lugs, each of the lugs provided with an axially extending third non-threaded opening formed therethrough, the third non-threaded openings configured to receive second fasteners therein which are installed in the second threaded openings of the anchor bracket to secure the non-rotatable vehicle component to the anchor bracket;
   wherein the anchor bracket includes on at least one of the arms a first shoulder at a transition between the first and second portions thereof, the first shoulder including a generally axially extending surface;
   wherein the non-rotatable vehicle component includes on at least one of the lugs a second shoulder having a generally axially extending surface which is generally complimentary to the shape of the axially extending surface of the first shoulder of the at least one arm of the anchor bracket such that when the non-rotatable vehicle component and anchor bracket are secured together by the second fasteners the axially extending surfaces of the first and second shoulders contact each other to substantially prevent rotational slippage of the anchor bracket relative to the non-rotatable vehicle component.

2. The disc brake assembly of claim 1 wherein the non-rotatable vehicle component is one of a knuckle, an axle flange and a drum-in-hat adapter.

3. The disc brake assembly of claim 1 wherein the second threaded openings in the anchor bracket define a first axis and the third non-threaded openings in the non-rotatable vehicle component define a second axis which is offset relative to the first axis.

4. The disc brake assembly of claim 1 wherein the second threaded openings in the anchor bracket define a first axis and the third non-threaded openings in the non-rotatable vehicle component define a second axis which is coaxial relative to the first axis.

5. The disc brake assembly of claim 1 wherein at least one of the second fasteners includes a conical shaped surface, at least one of the third non-threaded openings of the non-rotatable vehicle component includes a conical shaped surface, wherein the conical shaped surface of the at least one of the third non-threaded openings of the non-rotatable vehicle component is configured to be at least partially contacted by the conical shaped surface of the at least one of the second fasteners.

6. The disc brake assembly of claim 5 wherein the conical shaped surface on the at least one of the third non-threaded openings of the non-rotatable component is located on a side of the non-rotatable component which is opposite to a side having the first shoulder provided thereon at the transition between the first and second portions thereof.

7. The disc brake assembly of claim 1 wherein the second shoulder of the lug on the at least one of the lugs of the non-rotatable vehicle component includes a radially extending surface which does not contact the anchor bracket.

8. The disc brake assembly of claim 1 wherein the second openings in the anchor bracket define a first axis and the third non-threaded openings in the non-rotatable vehicle component define a second axis which is offset relative to the first axis, wherein at least one of the second fasteners includes a conical shaped surface, at least one of the third non-threaded openings of the non-rotatable vehicle component includes a conical shaped surface, wherein the conical shaped surface of the at least one of the third non-threaded openings of the non-rotatable vehicle component is configured to be at least partially contacted by the conical shaped surface of the at least one of the second fasteners.

9. The disc brake assembly of claim 1 wherein an outer surface of the second fasteners is spaced from contact relative to an inner diameter surface of the non-threaded third openings of the non-rotatable vehicle component when the non-rotatable vehicle component and anchor bracket are secured together.

10. A disc brake assembly comprising:
an anchor bracket having a pair of arms interconnected by at least one tie bar, each of the arms including a first non-threaded opening formed in a first portion thereof and a second threaded opening formed in a second portion thereof;
a caliper supported on the anchor bracket by first fasteners which are configured to be installed in the caliper and be disposed in the first non-threaded openings of the anchor bracket; and
a non-rotatable vehicle component defining an axis and having a pair of lugs, each of the lugs provided with an axially extending third non-threaded opening formed therethrough, the third non-threaded openings configured to receive second threaded fasteners therein which are installed in the second threaded openings of the anchor bracket to secure the non-rotatable vehicle component to the anchor bracket;
wherein the anchor bracket includes on at least one of the arms a first shoulder at a transition between the first and second portions thereof, the first shoulder including a generally axially extending surface;
wherein the non-rotatable vehicle component includes on at least one of the lugs a second shoulder having a generally axially extending surface which is generally complimentary to the shape of the axially extending surface of the first shoulder of the at least one arm of the anchor bracket such that when the non-rotatable vehicle component and anchor bracket are secured together by the second threaded fasteners the axially extending surfaces of the first and second shoulders contact each other to substantially prevent rotational slippage of the anchor bracket relative to the non-rotatable vehicle component;
wherein the second openings in the anchor bracket define a first axis and the third non-threaded openings in the non-rotatable vehicle component define a second axis which is offset relative to the first axis;
wherein at least one of the second threaded fasteners includes a conical shaped surface, at least one of the third non-threaded openings of the non-rotatable vehicle component includes a conical shaped surface, wherein the conical shaped surface of the at least one of the third non-threaded openings of the non-rotatable vehicle component is configured to be at least partially contacted by the conical shaped surface of the at least one of the second threaded fasteners.

11. The disc brake assembly of claim 10 wherein the non-rotatable vehicle component is one of a knuckle, an axle flange and a drum-in-hat adapter.

12. The disc brake assembly of claim 10 wherein the second shoulder of the lug on the at least one of the lugs of the non-rotatable vehicle component includes a radially extending surface which does not contact the anchor bracket.

13. The disc brake assembly of claim 10 wherein an outer surface of the second fasteners is spaced from contact relative to an inner diameter surface of the non-threaded third openings of the non-rotatable vehicle component when the non-rotatable vehicle component and anchor bracket are secured together.

14. The disc brake assembly of claim 10 wherein the conical shaped surface on the at least one of the third non-threaded openings of the non rotatable component is located on a side of the non-rotatable component which is opposite to a side having the first shoulder provided thereon at the transition between the first and second portions thereof.

15. A method comprising the steps of:
(a) providing an anchor bracket having a pair of arms, each of the arms including a first non-threaded opening formed in a first portion thereof and a second threaded opening formed in a second portion thereof;
(b) supporting a caliper on the anchor bracket by first fasteners which are configured to be installed in the caliper and be disposed in the first non-threaded openings of the anchor bracket; and
(c) securing the anchor bracket to a non-rotatable vehicle component defining an axis and having a pair of lugs by second fasteners, wherein each of the lugs is provided with an axially extending third non-threaded opening formed therethrough, the third non-threaded openings configured to receive second fasteners therein which are installed in the second threaded openings of the anchor bracket to secure the non rotatable vehicle component to the anchor bracket, wherein the anchor bracket includes on at least one of the arms a first shoulder at a transition between the first and second portions thereof, the first shoulder including a generally axially extending surface, and wherein the non-rotatable vehicle component includes on at least one of the lugs a second shoulder having a generally axially extending surface which is generally complimentary to the shape of the generally axially extending surface of the first shoulder of the at least one arm of the anchor bracket such that when the non-rotatable vehicle component and anchor bracket are secured together by the second fasteners the axially extending surfaces of the first and second shoulders contact each other to substantially prevent rotational slippage of the anchor bracket relative to the non-rotatable vehicle component.

16. The method of claim 15 wherein at least one of the second fasteners includes a conical shaped surface, at least one of the third non-threaded openings of the non-rotatable vehicle component includes a conical shaped surface, and wherein during the step (c) the conical shaped surface of the at least one of the third non-threaded openings of the non-rotatable vehicle component is configured to be at least partially contacted by the conical shaped surface of the at least one of the second fasteners as the second fasteners are tightened to thereby move the anchor bracket relative to non-rotatable vehicle component.

17. The disc brake assembly of claim 5 wherein the only contact between the at least one of the second fasteners and the at least one of the third non-threaded openings of the non-rotatable vehicle component occurs at the associated conical shaped surfaces of each other.

18. The disc brake assembly of claim 10 wherein the only contact between the at least one of the second fasteners and the at least one of the third non-threaded openings of the non-rotatable vehicle component occurs at the associated conical shaped surfaces of each other.

19. The method of claim 16 wherein the only contact between the at least one of the second fasteners and the at least one of the third non-threaded openings of the non-rotatable vehicle component occurs at the associated conical shaped surfaces of each other.

* * * * *